US011689514B2

(12) United States Patent
Hau et al.

(10) Patent No.: US 11,689,514 B2
(45) Date of Patent: *Jun. 27, 2023

(54) USER AUTHENTICATION IN COMMUNICATION SYSTEMS

(71) Applicant: Swisscom AG, Bern (CH)

(72) Inventors: Thorsten Hau, Kaufdorf (CH); Aibek Sarimbekov, Zurich (CH); Alexander Scharnofske, Bern (CH)

(73) Assignee: SWISSCOM AG, Bern (CH)

( * ) Notice: Subject to any disclaimer, the term of this patent is extended or adjusted under 35 U.S.C. 154(b) by 202 days.

This patent is subject to a terminal disclaimer.

(21) Appl. No.: 17/062,950

(22) Filed: Oct. 5, 2020

(65) Prior Publication Data

US 2021/0092106 A1 Mar. 25, 2021

Related U.S. Application Data

(63) Continuation of application No. 15/834,823, filed on Dec. 7, 2017, now Pat. No. 10,798,080.

(30) Foreign Application Priority Data

Dec. 7, 2016 (EP) .................................. 16202699

(51) Int. Cl.
*G06F 21/31* (2013.01)
*H04L 9/40* (2022.01)
(Continued)

(52) U.S. Cl.
CPC ............ *H04L 63/08* (2013.01); *G06F 16/435* (2019.01); *G06F 16/95* (2019.01); *G06F 21/31* (2013.01);
(Continued)

(58) Field of Classification Search
CPC ... H04L 63/0876; H04L 63/08; H04L 9/3213; H04L 9/3297; H04L 63/0807; G06F 16/435; G06F 16/95; G06F 21/31
See application file for complete search history.

(56) References Cited

U.S. PATENT DOCUMENTS 6,266,774 B1 * 7/2001 Sampath ............... H04L 63/083
726/19
8,656,026 B1 2/2014 Prasad et al.
(Continued)

FOREIGN PATENT DOCUMENTS

CA 2527550 5/2007
CN 105072108 A * 11/2015 ......... H04L 63/0428
(Continued)

OTHER PUBLICATIONS

"REST Web Service authentication token implementation", Mar. 19, 2013, obtained online from <https://stackoverflow.com/questions/15490265/rest-web-service-authentication-token-implementation>, retrieved on Sep. 30, 2022 (Year: 2013).*
(Continued)

*Primary Examiner* — Farid Homayounmehr
*Assistant Examiner* — Zhimei Zhu
(74) *Attorney, Agent, or Firm* — McAndrews, Held & Malloy, Ltd.

(57) ABSTRACT

Methods and systems are provided for user authentication in communication systems. An identification token may be generated in response to a user terminal loading a web page from a web server, with the identification token associated with a time stamp indicating when a network address is used by the user terminal, and with generating the identification token being triggered in response to a request from the user terminal to load the web page. User authentication information, associated with the network address and the time stamp, may be obtained and sent to one or both of the user
(Continued)

terminal and the web server for authenticating the user of the communication network. Triggering the generating of the identification token may include instructing the user terminal to request the identification token and/or identifying the network address in response to the request from the user terminal to load the web page.

21 Claims, 3 Drawing Sheets

(51) Int. Cl.
  *H04L 9/32* (2006.01)
  *G06F 16/95* (2019.01)
  *G06F 16/435* (2019.01)
(52) U.S. Cl.
  CPC .......... *H04L 9/3213* (2013.01); *H04L 9/3297* (2013.01); *H04L 63/0807* (2013.01)

(56) References Cited

U.S. PATENT DOCUMENTS

| | | |
|---|---|---|
| 9,413,756 B1 | 8/2016 | Wang |
| 9,973,547 B1* | 5/2018 | Simms .................... H04L 47/22 |
| 2002/0099784 A1 | 7/2002 | Tran |
| 2003/0005118 A1 | 1/2003 | Williams |
| 2006/0155866 A1 | 7/2006 | Wei |
| 2006/0235796 A1 | 10/2006 | Johnson et al. |
| 2009/0198617 A1* | 8/2009 | Soghoian ............... G06Q 20/04 705/65 |
| 2011/0030047 A1 | 2/2011 | Gao et al. |
| 2011/0047566 A1 | 2/2011 | Matuchniak et al. |
| 2013/0067062 A1 | 3/2013 | Gaitonde et al. |
| 2013/0252583 A1 | 9/2013 | Brown et al. |
| 2013/0283362 A1 | 10/2013 | Kress et al. |
| 2014/0208407 A1 | 7/2014 | VanBlon et al. |
| 2014/0310792 A1* | 10/2014 | Hyland ............... H04L 63/0861 726/8 |
| 2015/0207787 A1* | 7/2015 | Cannell ................... H04L 63/08 726/4 |
| 2016/0021201 A1* | 1/2016 | Chen .................. G06F 16/9027 709/224 |
| 2017/0041144 A1* | 2/2017 | Krapf .................... H04L 9/3234 |
| 2017/0078285 A1* | 3/2017 | Lee .................. H04N 21/25816 |
| 2018/0332016 A1* | 11/2018 | Pandey ............... H04L 63/0428 |

FOREIGN PATENT DOCUMENTS

| | | | |
|---|---|---|---|
| WO | 03007571 | 1/2003 | |
| WO | 2009140953 | 11/2009 | |
| WO | WO-2010066295 A1 * | 6/2010 | ............ H04L 12/14 |
| WO | 2016186755 | 11/2016 | |

OTHER PUBLICATIONS

"The Mobile Browser as a Web-Based Platform for Identity", Ben Adida, 3 pages.
"Mobile Provided Identity Authentication on the Web", Jonas Högberg, 6 pages.
"The Increasing Importance of Proof-of-Possession to the Web", Michael B. Jones, dated Aug. 14, 2014, 2 pages.
"Adding Federated Identity Management to OpenStack", David W. Chadwick, et al., dated Dec. 6, 2012, 25 pages.

* cited by examiner

USER AUTHENTICATION IN COMMUNICATION SYSTEMS

CLAIM OF PRIORITY

This patent application is a continuation of U.S. patent application Ser. No. 15/834,823, filed on Dec. 7, 2017, which in turn claims the filing date benefit of and the right of priority to European (EP) Patent Application Serial No. 16202699.1, filed on Dec. 7, 2016. Each of these applications is hereby incorporated herein by reference in its entirety.

TECHNICAL FIELD

The present disclosure relates to communication solutions. In particular, various implementations in accordance with the present disclosure relate to user authentication in communication systems.

BACKGROUND

Conventional methods and systems for authenticating users can be costly, cumbersome and inefficient. Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for user authentication in communication systems, substantially as shown in and/or described in connection with at least one of the figures, as set forth more completely in the claims.

These and other advantages, aspects and novel features of the present disclosure, as well as details of an illustrated implementation thereof, will be more fully understood from the following description and drawings.

BRIEF DESCRIPTION OF THE DRAWINGS

Various features and advantages of the disclosure will become apparent from the following description of non-limiting exemplary implementations, with reference to the appended drawings, in which.

DETAILED DESCRIPTION OF THE DISCLOSURE

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

Certain example implementations in accordance with the present disclosure may be found in systems and methods for user authentication in communication systems and/or networks (e.g., the Internet), as described below in more detail below. In this regard, hypertext transfer protocol (HTTP) header enrichment may allow network operators to annotate HTTP connections via the use of a wide range of headers. Network operators may employ proxies to introduce such headers for operational purposes, and also to assist advertising programs in identifying the network user responsible for the originating traffic, with significant consequences for the user's privacy. Use of HTTP header enrichment may enable network operators to append information into HTTP traffic (e.g., an identifier, such as the mobile station international subscriber directory number (MSISDN)) to enable attribution of network resources to specific users, performance enhancement, analytics, and content access control and customization. Furthermore, network operators may monetize their network and user base through advertising programs by taking advantage of their position to inject unique tracking identifiers into every HTTP request, popularly known as "super-cookies."

However, HTTP header enrichment may have some disadvantages. For example, HTTP header enrichment may have serious consequences for millions of mobile subscribers all over the world. Standardization efforts and best practices suggest that service providers remove header enrichment at their network boundary to prevent privacy leaks. In reality, however, the injected HTTP headers often are not removed. Thus, any web server visited from a mobile device may use this information for purposes adverse to user interests, such as user discrimination and online tracking. Network users lack legal protections against these practices, which happen in a manner invisible to most of them. Furthermore, typical network users lack the mechanisms and knowledge to prevent operators from performing header injection and to stop online services from collecting their information. In general, too much traffic is header enriched, even if web servers do not request the header enrichment. More importantly, header enrichment does not work with HTTP secure (HTTPS), since adding or removing any header data would break the end-to-end encryption between the user and a web server.

Accordingly, the present disclosure may allow overcoming at least some of the disadvantages of existing salutation, such as the problems identified above and to avoid header enrichment in communication systems. In particular, in various example implementations in accordance with the present disclosure enhanced measures may be used to authenticate a user in more secure way. In this regard, in accordance with the present disclosure, users may be authenticated without the need to modify communication traffic—e.g., HTTPS traffic between user terminals and web servers.

One advantage of example implementations in accordance with the present disclosure is that the user authentication may be done without requiring use of a second (secure) channel, such as a short message service (SMS) channel. Thus, the user terminal does not need to be a phone. Rather, it may be any electronic device that may allow launching and using of a web browser to access particular web server(s).

Another advantage is that example implementations according to the present disclosure provide are very efficient. For example, in some implementations identification tokens may be used. Such identification tokens are generated and sent to the web server (by the token generator) only under particular conditions—e.g., in response to a specific request from the web server.

Another advantage is adaptability and compatibility with existing solutions. For example, example implementations according to the present disclosure may be practiced with requiring that web pages contain any unsecure HTTP components (all the web page components can be HTTPS components). In other words, when loading the web page, all the communications between the web server and the user terminal can be based on HTTPS. Furthermore, by implementing the method, header enrichment can be avoided.

In a particular example implementation, a network processing unit may be utilized to support user authentication in accordance with the present disclosure.

While some of the example implementations in accordance with the present disclosure are described in the context of a communication or computer network that uses Internet protocol (IP) to link devices of the communication network, the disclosure should not be understood to be limited to such environment. Rather, the solutions described with respect to the present disclosure may apply to various types of communication systems and/or networks, particularly used to identify and/or to authenticate a communication party in a communication network. This is beneficial for example when carrying out web transactions including online shopping. Identical or corresponding functional and structural elements which appear in the different drawings are assigned the same reference numerals.

Figure 1:
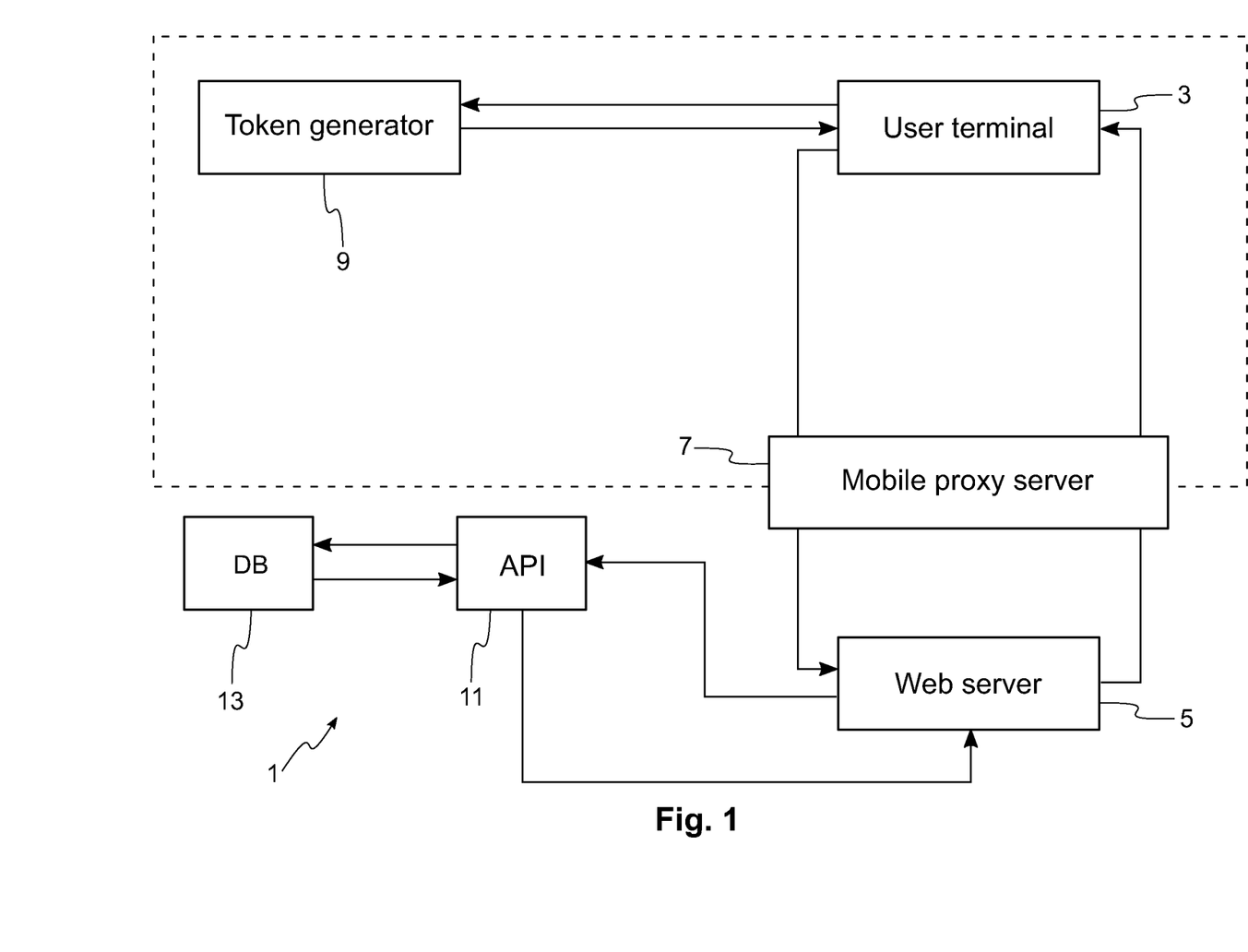
FIG. 1 is a block diagram illustrating elements of an example communication network that may be configured for supporting user authentication in accordance with the present disclosure.

FIG. 1 is a block diagram illustrating elements of an example communication network that may be configured for supporting user authentication in accordance with the present disclosure. Shown in FIG. 1 is an example communication network 1 that may be configured for supporting user authentication.

The communication network 1 may comprise a wireless and/or wired based network. The communication network 1 may comprise various elements. In this regard, each of the elements of the communication network 1 may comprise suitable circuitry for implementing various aspects of the present disclosure. Such circuitry may comprise, for example, general or dedicated processing circuitry, storage circuitry, communication-related circuitry, etc. In some instances, a network element may be implemented as a single physical apparatus, which may reside centrally in the network. In other instances, however, the various steps and/or related operations may be performed by various different components and/or subsystems of the network. In this regard, the different components and/or subsystems may interact with each other, and data or control services may be performed or handled either in a centralized way, or may have their functionalities distributed among the different subsystems, for example leveraging the cooperation between the different subsystems.

As shown in FIG. 1, the communication network 1 may comprise a communication device (e.g., user terminal) 3, a third party web server 5, a proxy server (e.g., mobile proxy server) 7, a token generation server (referred hereinafter as "token generator") 9, a network processing unit 11 (e.g., an application programming interface (API) device), and a database (DB) 13. In this regard, each of the elements shown in the example implementation illustrated in FIG. 1 may be a physically separate network element.

The communication device 3 may comprise a user or subscriber terminal or simply a terminal (and is referred to as such hereinafter), such as a mobile phone or a smartphone or a tablet, for example. As shown in FIG. 1, the user terminal 3 may be the only wireless element in the network 1. The user terminal 3 may allow launching and using a web browser, such as for browsing web pages on the internet forming a global system of interconnected computer networks that use the IP to link devices worldwide by a broad array of electronic, wireless and/or optical networking technologies. In this regard, a web browser is a software application for retrieving, presenting, and traversing information resources on the World Wide Web (WWW). In the example use scenario described in FIG. 1, the user terminal 3 may load web pages or web sites from the web server 5.

As shown in this example use scenario illustrated in in FIG. 1, all the traffic between the user terminal 3 and the third party server 5 transits via the proxy server 7, which may comprise a mobile proxy server (and is referred to hereinafter as a "mobile proxy"). The mobile proxy 7 may be configured to carry out for instance network address translation (NAT), which is a method of remapping one IP address space into another by modifying network address information in IP datagram packet headers while they are in transit across a traffic routing device, in this example the mobile proxy 7. In a network operating in a traditional manner, the mobile proxy would also typically implement the header enrichment. However, according to the present invention, header enrichment is not needed.

The token generator 9 may be configured for generating data elements, referred to as identification tokens (or simply tokens), which may be utilized in user authentication, as explained in more detail below. In an example implementation, the token generator 9 may be configured to communicate bidirectionally with the user terminal 3 or with other user terminals (not shown in FIG. 1). Further, in some implementations and/or use scenarios, the token generator 9 may not be configured to communicate with other types of communication network elements such as the web server 5. The token generator 9 may receive data from the user terminal 3, and may directly send the tokens to the web server 5 via the mobile proxy 7.

The network processing unit (or API) 11 may be configured to bidirectionally communicate with the web server 5, while the database (DB) 13 may be configured to bidirectionally communicate with the API 11. The database 13 may comprise a table listing network addressing information—e.g., IP addresses of a given IP range (for example the IP address range of the network operator to which the database belongs) linked to a particular user terminal. In other words, each IP address in the database 13 may be linked to an identifier (e.g., an identification number) of a user terminal or its subscriber identity module. The identifier may be the MSISDN, for example. Each IP address-identifier pair may also have additional information—e.g., an associated time stamp indicating a time instant when a particular IP address was used by a user terminal of a particular subscriber identity module, or a time period in which a particular IP address was used by a user terminal of a particular subscriber identity module. The token generator 9 may not require any persistent data storage. In other words, once a token is issued and sent, the token can be deleted and there is no need to store it any longer.

In an example implementation, one mobile proxy 7, one token generator 9, one API 11 and one database 13 may be required for each network operator. Furthermore, it is possible that the API 11 and the database 13 may be combined into a single physical element rather than be implemented as two separate physical elements, as shown in the FIG. 1 (and referenced as such in the remaining figures).

Figure 2:
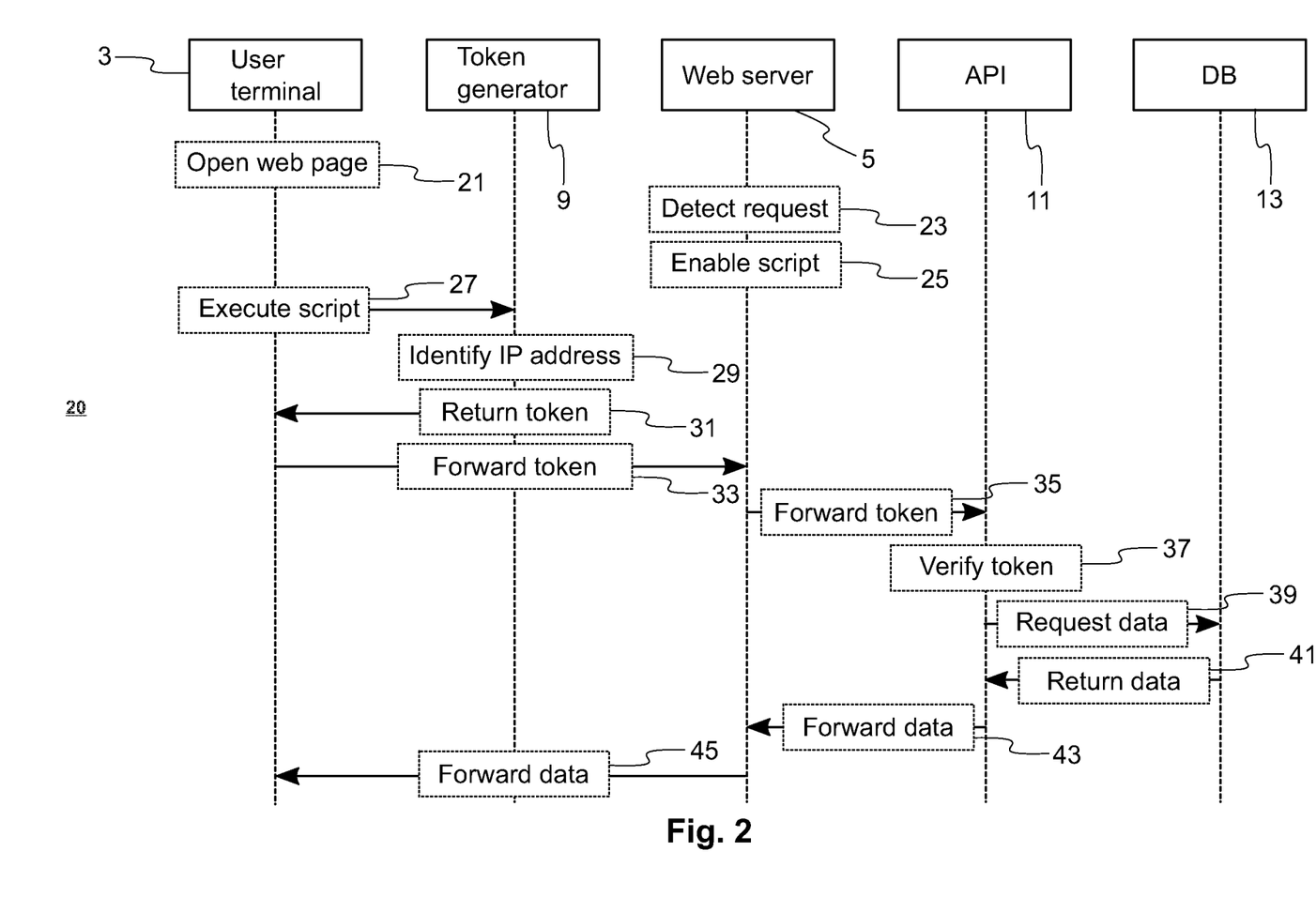
FIG. 2 is a flow chart illustrating an example process for authenticating a communication party in a communication network according to a first example implementation in accordance with the present disclosure.

FIG. 2 is a flow chart illustrating an example process for authenticating a communication party in a communication network according to a first example implementation in accordance with the present disclosure. Shown in FIG. 2 is flow chart 20 illustrating an example process for user authentication in accordance with the present disclosure. In this regard, as a non-limiting example, the process represented by flow chart 20 is described with reference to the communication network 1 of FIG. 1.

In step 21, a user of the user terminal 3 may initiate a web-based application in the user terminal 3—e.g., opening a web page located at the web server 5. For example, the user requests the web page content from the web server 5.

In step 23, the web server 5 detects that the request is coming through the NAT (and has a certain IP address range). In this regard, it is to be noted that at least some of the network elements (e.g., the network elements within the boundary defined by the dashed line in FIG. 1) have the same IP address range—that is, they belong to the same network or sub-network. Such zone may be considered to be a demilitarized zone (in computing terms), which is a physical and/or logical sub-network.

In step 25, the web server 5 enables the user terminal 3 to access the token generation 9. For example, the web server 5 may enable a script (e.g., a Java script), to enable the user terminal 3 to access the token generator 9. Alternatively, the web server 5 may issue a redirect command (e.g., uniform resource locator (URL) redirect command) to redirect the user terminal 3 to the token generator 9, to request the identification token from the token generator 9.

In step 27, the user terminal 3 sends the request to the token generator 9, such as by executing the script enabled by the web server 5. For example, the execution of the script triggers the user terminal 3 to send the request to the token generator 9. If the sole purpose of the token generator 9 is to issue and deal with tokens, then the request sent in step 27 may not need to take any parameters (e.g., the request could simply be "get( )" invocation—that is, it may be an empty HTTP or HTTPS request), because the token generator 9 would interpret any message it receives as a request to issue a token.

In step 29, the token generator 9 identifies the private IP address of the user terminal 3. The IP address may be detected from, e.g., the request received from the user terminal 3.

In step 31, the token generator 9 generates a token and sends it to the user terminal 3. For example, the token may be generated based on the IP address of the user terminal 3 and a time stamp indicating the time when the user terminal 3 used the IP address. In other words, the token comprises the IP address of the user terminal 3 and the time stamp for the IP address. Thus, the token may be considered to be a function of the time and IP address valid at that moment. It is to be noted that in instances where the user terminal 3 may be a mobile terminal, its IP address may change frequently.

In step 33, the user terminal 3 receives the token and forwards it to the web server 5 via the mobile proxy 7. The communications between the user terminal 3 and the token generator 9 may be encrypted. In this regard, separate transportation encryption and token encryption may be used. Thus, the elements in the network 1 may use secure protocols to exchange the token. Encryption may also be used for the communications between the user terminal 3 and the web server 5. In an example implementation and corresponding user scenario, the token is encrypted by the token generator 9 with a public key of the API 11. Thus, in this example, the only entity capable of decrypting the token may be the API 11. The token generator 9 (or other elements encrypting data) may use a strong encryption with salt for example to avoid attacks against the encryption. If such a strong encryption is not used, an attacker may be able to retrieve many tokens in a very short time, and could possibly guess that only one byte/bit changes. This could be an attack vector. This may be overcome by use of additional measures, such as salting—that is, by using salt to change many bits. In this regard, salting comprises adding a random number to the token content so that a brute force attacker cannot guess the password used to encrypt the data. A salt is random data that is used as an additional input to a one-way function that hashes a passphrase or password. Other techniques may be used, however. For example, instead of salt, another random number or pseudorandom number generator may be used to make the encryption stronger.

In step 35, the web server 5 generates a request using the token as a query parameter and sends the request to the API 11. This step may also include first decrypting the message received from the user terminal 3 and then encrypting the request to be sent to the API 11.

In step 37, the API receives the request and verifies its freshness (using the time stamp) and that it is from a recognized partner (e.g., that the web server belongs to the same network operator as the API 11). This step may also comprise decrypting the request if the request is encrypted to extract the IP address and time stamp.

In step 39, the API 11 sends an identification request (to receive subscriber information) to the database 13. For example, the identification request may use the IP address and time stamp to query the database 13. In such example use scenario, the API 11 utilizes the MSISDN of the user terminal 3. Thus, the identification request in this example indicates that the API 11 queries the MSISDN of the user terminal 3 to which the token relates or is associated. It is also possible, that the MSISDN (or another parameter instead) is returned by default every time the database 13 receives a request from the API 11. Since the connection between the API 11 and the database 13 is secured, there may not be any need to encrypt the communications between these two elements.

In step 41, the database 13 fetches the requested information associated with the token and sends it to the API 11. As explained above, the database 13 "knows" when a particular user terminal 3 used a particular IP address (e.g., based on the associated timestamp). The database 13 may store supplementary user information or data relating to a particular user terminal or to its subscriber identity module. The supplementary user information may comprise, e.g., the name, postal and/or home address, email address, secondary phone number, birthday, user terminal hardware identifier, preferred payment process, payment card details, etc.

In step 43, the API 11 forwards the requested information to the web server 5 and preferably encrypts (e.g., with the public key of the web server 5) the information before sending it. As a result, the web server 5 would at this point have identified or authenticated the user terminal 3.

In step 45, the web server 5 forwards at least part of the information to the user terminal 3. Alternatively or additionally, the information could also be used by the web server 5, such as for tracking, statistics, etc. If the web server 5 only received the MSISDN for example, then it may request at least some of the supplementary information relating or associated to the MSISDN before forwarding the information to the user terminal 3.

The above-described process may be used as an authentication process for transactions or web services. In the above process, the token may be transported in an HTTP or HTTPS payload between various network elements. It is to be noted that HTTP or HTTPS messages comprise a payload portion for the data content which needs to be transferred and an overhead portion or header, different from the payload portion. The process allows the web server 5 to reliably authenticate the user of the user terminal 3. A major advantage of the process is that the user terminal 3 from which a HTTP(S) stream originates can be unambiguously identified without user interaction. The process may be triggered for example if the user clicks on a specific link on a web page. The link may be a confirmation to buy an item online, for instance. In this case, in step 45, the web server 5 would send some data relating to the subscriber to the user terminal 3 so that the browser of the user terminal could automatically fill in a form relating to the transaction. The form could have fields for the same information as the web server 5 received from the database 13 (via the API 11). Furthermore, the web server 5 and the user terminal 3 can be confident that the information provided is correct and accurate since the information was obtained from a reliable source (the database 13).

Figure 3:
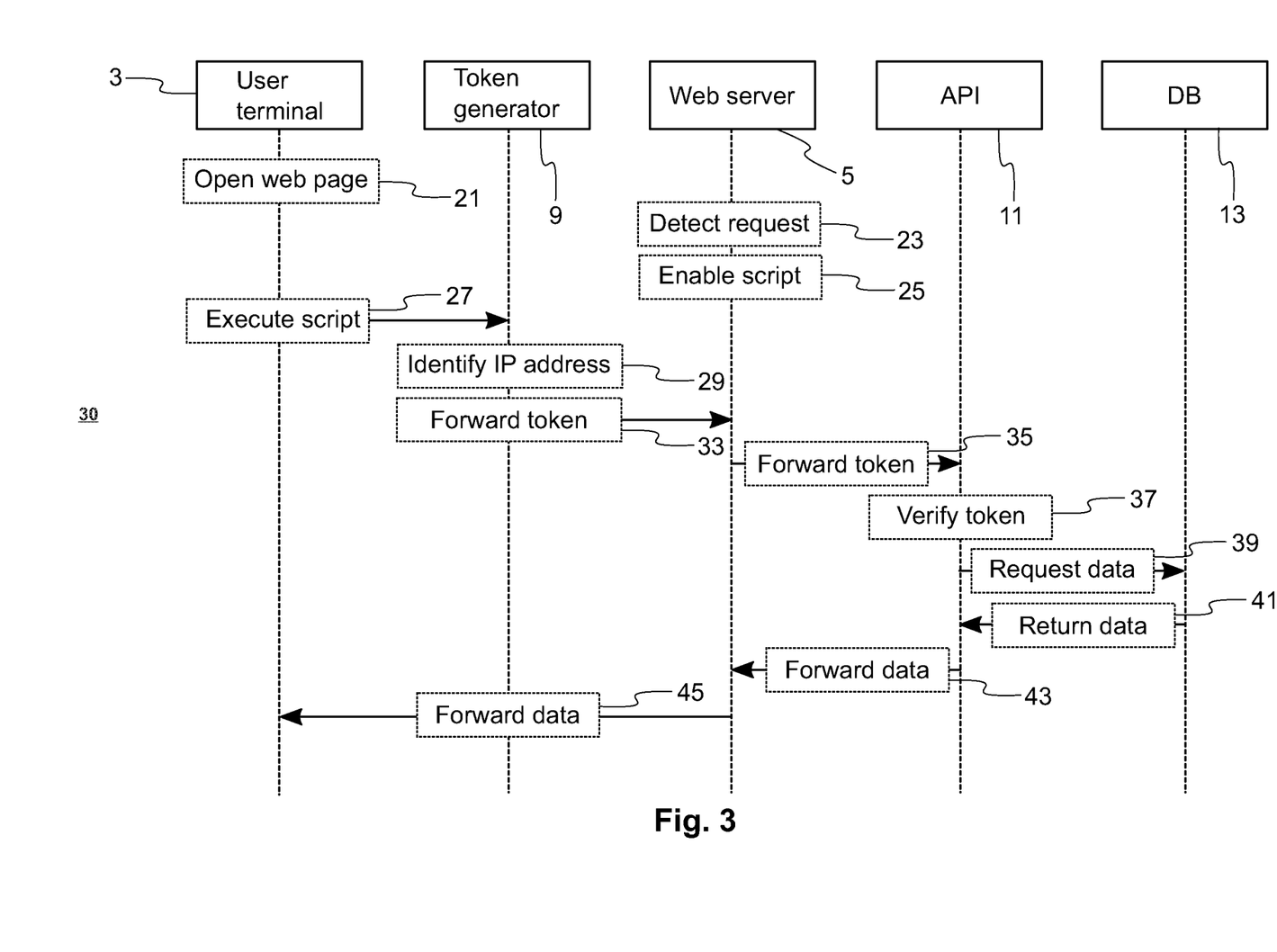
FIG. 3 is a flow chart illustrating an example processing for authenticating a communication party in a communication network according to a second example implementation in accordance with the present disclosure.

FIG. 3 is a flow chart illustrating an example processing for authenticating a communication party in a communication network according to a second example implementation in accordance with the present disclosure. Shown in FIG. 3 is flow chart 30 illustrating an example process for user authentication in accordance with the present disclosure. In this regard, the process represented by flow chart 30 is described with reference to the communication network 1 of FIG. 1.

The process illustrated in FIG. 3 to this example implementation is substantially similar to the process of the first example, as described with respect to FIG. 2. However, according to the second example process illustrated in FIG. 3, the token generator 9 does not send the token to the user terminal 3. Rather, in this process variant, in step 33, the token generator 9 sends the token directly to the web server 5. Furthermore, according to this process variant, a session identifier (ID) of the browsing session is used in the process to make sure that various messages are linked to the correct browsing session. In this example, the session ID is included in the messages sent in steps 27, 33 and 45. It is to be noted that according to the first example, the session ID may not be needed. In some instances, the token generator 9 communicates directly with the API 11 and the database 13 and then sends the payload (e.g., the MSISDN) to the user terminal 3 or to the web server 5.

Further, in this process variant, the token is not received by the API 11 via the web server 5. Also in this process variant, the session ID may be used in a manner similar to what was explained above. This process variant assumes that the token generator 9 knows how to directly reach the API 11.

In an example implementation, the operation of the web server 5 can be summarized in the following manner. The web server 5 receives a first request from the user terminal 3 to load a web page. The web server instructs the user terminal 3 to request an identification token from the token generator 9. The web server 5 receives the identification token issued by the token generator 9, the identification token comprising a network address associated with a time stamp indicating when the network address was used by the user terminal 3. The web server 5 sends a second request comprising the identification token to the processing unit 11. The web server 5 receives user authentication information relating to the identification token from the network processing unit 11 to authenticate the communication network user.

While the invention has been illustrated and described in detail in the drawings and foregoing description, such illustration and description are to be considered illustrative or exemplary and not restrictive, the invention being not limited to the disclosed embodiment. Other embodiments and process variants are understood, and can be achieved by those skilled in the art when carrying out the claimed invention, based on a study of the drawings, the disclosure and the appended claims. For example, it would be also possible to determine a unique user terminal ID, such as a media access control (MAC) address of the user terminal 3, to authenticate the user terminal 3.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein. In an example implementation, a computer program product may be arranged to execute the process described above. The computer program product may be run by the web server 5 and/or by the network processing unit 11, for example.

Accordingly, the present disclosure may be realized in hardware, software, or a combination of hardware and software. The present disclosure may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure makes reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present disclosure not be limited to the particular embodiment disclosed, but that the present disclosure will include all embodiments falling within the scope of the appended claims.

What is claimed is:

1. A method for authenticating users in a communication network, the method comprising:
   generating an identification token in response to a user terminal loading a web page from a web server, wherein:
      the identification token is associated with a time stamp indicating when a network address is used by the user terminal; and
      generating the identification token is triggered in response to a request from the user terminal to load the web page;
   securing token related exchanges, wherein the securing comprises applying separate security measures to the identification token itself and any communication of the identification token;
   obtaining user authentication information associated with the network address and the time stamp; and
   sending the user authentication information to one or both of the user terminal and the web server for authenticating the user of the communication network.

2. The method according to claim 1, wherein triggering the generating of the identification token comprises instructing the user terminal to request the identification token in response to receiving by the web server of the request from the user terminal to load the web page.

3. The method according to claim 1, wherein triggering the generating of the identification token comprises identifying the network address in response to the request from the user terminal to load the web page.

4. The method according to claim 1, comprising enabling by the web server, in response to receiving the request, a script to be executed by the user terminal to request the identification token.

5. The method according to claim 4, wherein the execution of the script triggers the user terminal to request the identification token from a token generator.

6. The method according to claim 1, comprising, in response to the request, issuing by the web server a redirect command to redirect the user terminal to a token generator to request the identification token.

7. The method according to claim 1, wherein the user authentication information comprises at least one of the following: name of the user, physical address of the user, email address of the user, secondary phone number of the user, user terminal identifier, birthday of the user, preferred payment method of the user and payment card details of the user.

8. The method according to claim 1, comprising obtaining the user authentication information from a database associated with the communication network.

9. The method according to claim 8, wherein the database comprises a table of network addresses, with each network address linked to a particular network user and to a time stamp.

10. The method according to claim 1, wherein the identification token is associated with a session identifier of a web browsing session of the user terminal.

11. The method according to claim 1, comprising encrypting the identification token for communication between at least two different network elements in the communication network.

12. A system for authenticating users in a communication network, the system comprising:
   a token generator comprising one or more circuits, wherein the token generator is configured to generate an identification token in response to a user terminal loading a web page, and wherein:
      the identification token is associated with a time stamp indicating when a network address is used by the user terminal; and
      generating the identification token is triggered in response to a request from the user terminal to load the web page;
   a network processing unit comprising one or more circuits, wherein the network processing unit is configured to:
      secure token related exchanges, wherein the securing comprises applying separate security measures to the identification token itself and any communication of the identification token;
      obtain user authentication information associated with the network address and the time stamp; and
      send the user authentication information to one or both of the user terminal and a network element configured to provide the web page for authenticating the user of the communication network.

13. The system according to claim 12, wherein the network element is configured to, in response to receiving the request from the user terminal to load the web page, instruct the user terminal to request the identification token from the token generator.

14. The system according to claim 12, wherein the network element is configured to, in response to receiving the request from the user terminal to load the web page, identify the network address before triggering generating the identification token.

15. The system according to claim 12, wherein the network element is configured to, in response to receiving the request from the user terminal to load the web page, enable a script to be executed by the user terminal to request the identification token.

16. The system according to claim 15, wherein the user terminal is configured to execute the script, the execution of the script triggering the user terminal to request the identification token from the token generator.

17. The system according to claim 12, wherein the network element is configured to, in response to receiving the request from the user terminal to load the web page, issue a redirect command to redirect the user terminal to the token generator to request the identification token.

18. The system according to claim 12, wherein the network processing unit is configured to access a database of the communication network to obtain the user authentication information.

19. The system according to claim 12, wherein the network element is configured to, before the network processing unit receives the identification token:
  receive the identification token from the token generator; and
  send a request comprising the identification token to the network processing unit.

20. The system according to claim 19, comprising a network address translator unit, and wherein the network element is configured to receive the identification token directly from the token generator via the network address translator unit.

21. The system according to claim 12, wherein the token generator is configured to encrypt the identification token before sending it to the network processing unit.

* * * * *